United States Patent Office 3,278,438
Patented Oct. 11, 1966

3,278,438
SYNTHETIC POLYESTER LUBRICANTS
Paul M. Kerschner, Trenton, N.J., assignor to Cities Service Oil Company, a corporation of New Jersey
No Drawing. Filed Oct. 7, 1963, Ser. No. 314,527
5 Claims. (Cl. 252—56)

This invention relates to novel synthetic polyester lubricants. More particularly this invention is directed to certain polyesters having cycloaliphatic groups.

Presently available mineral hydrocarbon lubricating oils used in conventional internal combustion engines suffer from numerous shortcomings including limited application under the vigorous conditions at which many of the more modern engines, e.g. jet engines, operate.

The inherent disadvantages of mineral hydrocarbon lubricating oils have generally made them unsuitable for jet and turbo-jet engines now used to power modern aircraft. In recent years a series of synthetic lubricants have become available to overcome some of the disadvantages of the hydrocarbon lubricants. These new synthetic lubricants are generally characterized by low changes in viscosity at increasing temperatures, high stability to oxidation, low pour point, high flash point and good extreme pressure properties.

Accordingly, an object of this invention is to provide a new series of polyester lubricants which overcome inherent disadvantages of mineral hydrocarbon lubricating oils.

It is another object of the present invention to provide a class of new polyesters suitable as lubricants for high temperature and extreme pressure use which have good stability to oxidation, a high flash point, good viscosities, relatively high viscosity indices, relatively low pour points and which possess beneficial properties as compared to other synthetic ester lubricants.

Other objects and advantages of the novel polyesters of the present invention, together with the methods by which they are made will be readily apparent from the detailed description which follows.

The novel polyesters of the present invention can be represented by the following generic formula:

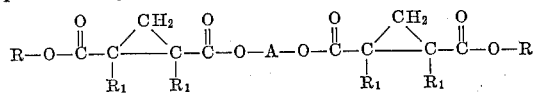

wherein each R is alkyl having from 1 to about 18 carbon atoms, each $R_1$ is hydrogen or methyl, and A is a saturated divalent aliphatic residue of a glycol having from 2 to about 18 carbon atoms linked to the adjacent oxygens of the generic formula through different carbon atoms.

Illustrative of members of the alkyl groups (R) in the generic formula for the polyesters of this invention there can be mentioned: methyl; ethyl; propyl; isopropyl; butyl; isobutyl; amyl; isoamyl; hexyl; heptyl; octyl; nonyl; decyl; undecyl; dodecyl; tridecyl; tetradecyl; pentadecyl; and hexadecyl. The alkyl group can be that of a straight or branched chain alkyl and the various alkyl groups in each polyester can be the same or different. Preferably R of the above generic formula is alkyl having from 1 to 6 carbon atoms whereas $R_1$ is preferably hydrogen.

The designator A in the above generic formula of the novel polyesters is a saturated divalent aliphatic residue of a glycol having from 2 to about 18 carbon atoms which is linked to the adjacent oxygens in the polyester through different carbon atoms, i.e. more than one carbon atom of the glycol residue separates the adjacent oxygen atoms of the generic formula, e.g. the adjacent oxygens are separated by at least an ethylene (—$CH_2$—$CH_2$—) group. This glycol residue is preferably an alkylene group, however the alkylene group can be substituted by fluorine atoms; also the glycol residue can be an alkylene group which can be substituted or unsubstituted with fluorine atoms and which is interlinked by atoms of oxygen or sulfur provided that there are at least 2 carbon atoms on either side of the linking oxygen or sulfur of the glycol residue, e.g. the dialkylene terminated residue of triethylene glycol, tetraethylene glycol, dipropylene glycol, etc. When A of the generic formula is an alkylene or fluorine substituted alkylene radical it can be further represented by the designator —$R_3$— wherein $R_3$ is an alkylene or fluorine substituted alkylene radical having from 2 to about 18 carbon atoms and from 0 to about 18 fluorine atoms, e.g. the oxygen free residue of the following glycols: ethylene glycol; propylene glycol; 1,4-butanediol; 2,3-butanediol; 1,3-butanediol; 1,14-tetradecanediol; 1,6-hexadecanediol; 1,18-octadecanediol; 1,1,5,5-tetrahydroperfluoro-1,5-pentanediol; and 1,1,4,4-tetrahydroperfluoro-1,4-butanediol. The preferred diol residue having oxygen interrupted chains can be represented by the designator —(EO)$_n$—E— wherein E is an alkylene radical having from 2 to 3 carbon atoms and (n) is an integer from 1 to 5. Illustrative of glycols having such residues there can be mentioned various polyoxyalkylene glycols such as: diethylene glycol; dipropylene glycol; triethylene glycol; tripropylene glycol; tetraethylene glycol; and mixed adducts of ethylene oxide and propylene oxide having the desired number of carbon atoms in the glycol residue. The preferred glycols are the alkylene glycols having from 2 to 6 carbon atoms, and particularly that of neopentyl glycol.

The novel polyesters of this invention are prepared by reacting a di(alpha-haloacid) glycol diester with an acrylic acid alkyl ester in the presence of a base condensation catalyst. The di(alpha-haloacid) glycol diesters are known compounds of the formula:

wherein each X is a middle halogen, i.e. chlorine or bromine and preferably chlorine, A is the same radical as described hereinbefore for the novel polyesters and each $R_2$ is alkylene having from 1 to 2 carbon atoms. Of course, the halogen is always on the carbon atom adjacent to the carbonyl (alpha position). The di(alpha-haloacid) glycol diesters are prepared by fully esterifying 1 mole of a glycol as described hereinbefore with 2 moles of alpha-haloacid. Illustrative of the alpha-haloacid there can be mentioned: chloroacetic acid; bromoacetic acid; alpha-chloropropionic acid and alpha-bromopropionic acid. Illustrative of the di(alpha-haloacid) glycol diesters there can be mentioned ethylene glycol di(chloroacetate); ethylene glycol di(bromoacetate); ethylene glycol di(alpha-chloropropionate); diethylene glycol di(chloroacetate); tetraethylene glycol di(chloroacetate); 1,3-butanediol di(chloroacetate); 1,3-butanediol di(alpha-chloropropionate); etc.

The acrylic acid alkyl ester reactant can be that of acrylic or methacrylic acid. The alkyl portion thereof can have from one to about 18 carbon atoms and preferably from 1 to 6 carbon atoms. The esters of acrylic acid are preferred. The acrylic acid alkyl ester reactants can be represented by the formula

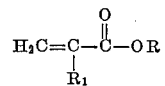

wherein $R_1$ is hydrogen or methyl and R is alkyl having from 1 to about 18 carbon atoms. Illustrative of suitable esters there can be mentioned methyl methacrylate; methyl acrylate; lauryl methacrylate; octyl methacrylate;

propyl acrylate; decyl acrylate; undecyl acrylate; pentadecyl methacrylate; and the like.

The base condensation catalysts are well known catalyst compositions. Illustrative of such catalysts there can be mentioned those of basic oxides, hydroxides, alkoxides, hydrides, cyanides, amides of alkali metals, alkali metals, e.g., metallic sodium or potassium, and other basic materials such as aralkyl quaternary ammonium hydroxides. Preferred base condensation catalysts are sodium methoxide, sodium hydride dispersed in oil, and benzyl trimethyl ammonium hydroxide.

It is preferred that the novel polyesters be prepared by intimately admixing the two reactants and the catalysts at temperatures of from about 15° C. to about 35° C. Optionally, inert organic solvents can be employed as the reaction medium. Such solvents can be inert hydrocarbons such as aryls, e.g., toluene, or alkyls, e.g., heptane. The molar ratio of the reactants can vary over a wide range. Preferably a molar excess of the acrylic acid ester reactant is employed such as from about 1.1 to about 6 moles of the acrylic acid ester and particularly from about 2 to 6 moles thereof for each mole of the haloacid ester. The quantity of base condensation catalyst should be sufficient to react with all of the halogen of the haloacid ester. Thus about equal molar quantities of the alpha-haloacid ester and the base condensation catalyst are preferably employed although the molar ratio can vary such as from about 0.5 to 2 moles of the catalyst per mole of the haloacid ester. The novel polyesters can be recovered from the reaction mixture by conventional techniques such as fractional distillation.

The following examples are illustrative of the invention.

*Example 1*

Into a 4-neck, 2-liter flask equipped with a mechanical stirrer, reflux condenser, thermometer and a powder addition-funnel is placed 230 gm. (0.9 mol.) of neopentyl glycol di(chloroacetate) and 348 gm. (4.05 mol.) of methyl acrylate. Rapid stirring was applied and 108 gm. (2.0 mol.) of sodium methoxide was slowly added at such a rate as to maintain a temperature of approximately 30° C. (an ice bath was used intermittently). After all of the sodium methoxide had been added, stirring was continued for an additional 2 hours. The reaction mixture was transferred to a separatory funnel and 600 ml. of toluene was added together with approximately 500 ml. of water. Sodium chloride was added until the aqueous phase was saturated. The mixture was vigorously shaken and after settling, the saturated saltwater phase was drawn off. Two more saturated saltwater washes were carried out. The organic phase was then dried over anhydrous magnesium sulfate. The dried sample was transferred to a round bottom flask and excess solvent and methyl acrylate recovered by distilling at reduced pressure. The product residue was transferred to a molecular still and the material distilling over the range of 109° C. to 136° C. at 19 to 22 mm. of Hg pressure was collected. This material was predominantly a polyester of the formula:

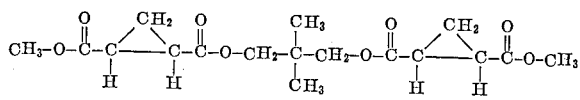

The properties of this polyester are listed below:

| | | |
|---|---|---|
| Flash pt. | °F | 200 |
| Fire pt. | °F | 345 |
| Pour pt. | °F | −70 |
| Viscosity at 100° F. | cs | 7.03 |
| Viscosity at 210° F. | cs | 1.83 |
| Saponification No. | | 512 |
| Bromine No. | | 0 |

*Example 2*

Following the procedure of Example 1, the corresponding polyesters of the following reactants can be prepared with the indicated catalysts: 24.3 gm. (0.1 mol.) of 1,4-butanediol di(chloroacetate) with 114.3 gm. (0.45 mol.) of lauryl methacrylate in the presence of 4.8 gm. (0.2 mol.) of sodium hydride dispersed in oil; 34.7 gm. (0.1 mol.) of 1,10-decanediol di(chloroacetate) with 82.8 gm. (0.45 mol.) octyl acrylate in the presence of 10.8 gm. (0.2 mol.) sodium methoxide; 35.5 gm. (0.1 mol.) of 1,12-dodecanediol di(chloroacetate) with 152.1 gm. (0.45 mol.) stearyl methacrylate in presence of 4.8 gm. (0.2 mol.) sodium hydride dispersed in oil; 100 gm. (0.274 mol.) of 1,5-(1,1,5,5-tetrahydroperfluoropentane)diol di(chloroacetate) with 106 gm. (1.23 mol.) of methyl acrylate in the presence of 33 gm. (0.61 mol.) sodium methoxide; 25.9 gm. (0.10 mol.) of 1,5-(3-oxapentane)-diol di(chloroacetate) with 89.0 gm. (0.45 mol.) octyl methacrylate in the presence of 4.8 gm. (0.2 mol.) sodium hydride dispersed in oil; 30.3 gm. (0.10 mol.) of 1,8-(3,6-dioxaoctane) glycol di(chloroacetate) with 108.0 gm. (0.45 mol.) lauryl acrylate in the presence of 10.8 gm. (0.2 mol.) sodium methoxide; 28.1 gm. (0.10 mol.) of 1,4-butanediol di(alpha-chloropropionate) with 45.0 gm. (0.45 mol.) methyl methacrylate in the presence of 4.8 gm. (0.2 mol.) of sodium hydride dispersed in oil.

*Example 3*

This example shows a suitable blend of a lubricating composition containing a synthetic lubricant of this invention and a conventional mineral hydrocarbon lubricating oil.

| | Percent |
|---|---|
| Mineral lubricating oil (100 neutral) | 10 |
| Polyester of Example 1 | 90 |
| Total | 100 |

The novel polyesters of this invention can be employed as synthetic lubricants either alone or in combination with various additives such as viscosity improvers, dyes, anticorrosion agents and other additives particularly adapted to tailor properties in the final product for particular use. The novel polyesters of this invention may also be blended with mineral hydrocarbon lubricating oils as well as with other synthetic lubricants. They can also be used as hydraulic fluids as well as in grease compositions. These polyesters are soluble in all proportions with mineral hydrocarbon lubricating oils of either naphthenic or paraffinic origin. Thus, lubricating compositions containing from about 5% to about 95% by weight of the novel polyesters and from about 5% to about 95% by weight of a mineral oil hydrocarbon lubricant can be prepared, although it is preferred that the blended lubricating composition contain from about 5% to about 50% by weight of the mineral oil and from about 95% to about 50% by weight of the novel polyesters and particularly at least 80% by weight of the novel polyesters in order to better take advantage of their desirable properties.

While the invention has been described in considerable detail with respect to certain preferred embodiments, it is to be understood that variations and modifications can be made which will fall within the scope of the invention described above and as defined in the claims which follow.

What is claimed is:

1. A synthetic lubricant of the formula:

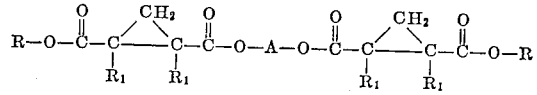

wherein each R is alkyl having from 1 to about 18 carbon atoms, A is a saturated divalent aliphatic residue of a glycol having from 2 to about 18 carbon atoms linked to the adjacent oxygens through different carbon atoms and each of $R_1$ is a member selected from the group consisting of hydrogen and methyl.

2. A synthetic lubricant of claim 1 wherein each R is alkyl having from 1 to 6 carbon atoms, A is alkylene having from 2 to 6 carbon atoms and $R_1$ is hydrogen.

3. A synthetic lubricant of claim 1 wherein each R is alkyl having from 1 to 6 carbon atoms, each $R_1$ is hydrogen and A is an aliphatic radical of the formula $-(EO)_n-E-$ wherein E is an alkylene radical having from 2 to 3 carbon atoms and $n$ is an integer from 1 to 5.

4. A synthetic lubricant of the formula:

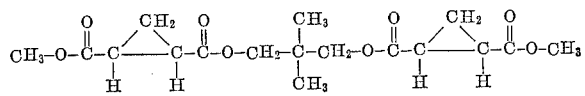

5. A lubricating composition comprising from about 5% to 95% by weight of a mineral lubricating hydrocarbon oil and from about 95% to 5% by weight of a synthetic lubricant of the formula

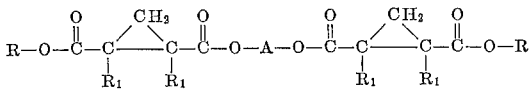

wherein each R is alkyl having from 1 to about 18 carbon atoms, A is a saturated divalent aliphatic residue of a glycol having from 2 to about 18 carbon atoms and linked to the adjacent oxygens through different carbon atoms, and $R_1$ is a member selected from the group consisting of hydrogen and methyl.

References Cited by the Examiner

"Jour. Am. Chemical Soc.," vol. 80, pages 6568–72 (1958), McKoy.

"Jour. Am. Chemical Soc.," vol. 83, pages 2962–63 (1961), Inouye et al.

"Chemical Abstracts," vol. 54 (1960), pages 1345f, Mousseron et al.

"Chemical Abstracts," vol. 53 (1959), page 17921f, Mousseron et al.

DANIEL E. WYMAN, *Primary Examiner.*

W. H. CANNON, *Assistant Examiner.*

UNITED STATES PATENT OFFICE
CERTIFICATE OF CORRECTION

Patent No. 3,278,438

October 11, 1966

Paul M. Kerschner

It is hereby certified that error appears in the above numbered patent requiring correction and that the said Letters Patent should read as corrected below.

In the heading to the printed specification, line 4, for "a corporation of New Jersey" read -- a corporation of Delaware --;

Signed and sealed this 29th day of August 1967.

(SEAL)
Attest:

ERNEST W. SWIDER
Attesting Officer

EDWARD J. BRENNER
Commissioner of Patents